(12) United States Patent
Chang et al.

(10) Patent No.: US 8,373,304 B2
(45) Date of Patent: Feb. 12, 2013

(54) CURRENT-SHARING SUPPLY CIRCUIT FOR DRIVING MULTIPLE SETS OF DC LOADS

(75) Inventors: Shih-Hsien Chang, Taoyuan Hsien (TW); Po-Nien Ko, Taoyuan-Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 472 days.

(21) Appl. No.: 12/830,842

(22) Filed: Jul. 6, 2010

(65) Prior Publication Data
US 2011/0006604 A1    Jan. 13, 2011

(30) Foreign Application Priority Data
Jul. 7, 2009  (TW) .............................. 98122996 A

(51) Int. Cl.
*H01J 23/34* (2006.01)
(52) U.S. Cl. ............................ 307/31; 315/213; 315/220

(58) Field of Classification Search .................. 315/212, 315/213, 219, 220, 294; 307/31
See application file for complete search history.

(56) References Cited

U.S. PATENT DOCUMENTS

| 5,444,608 | A * | 8/1995 | Jain et al. | 363/17 |
|---|---|---|---|---|
| 8,183,795 | B2 * | 5/2012 | Huang et al. | 315/294 |
| 2010/0052554 | A1 * | 3/2010 | Zanforlin | 315/210 |
| 2010/0270945 | A1 * | 10/2010 | Chang et al. | 315/294 |

* cited by examiner

*Primary Examiner* — Daniel Cavallari
(74) *Attorney, Agent, or Firm* — Kirton McConkie; Evan R. Witt

(57) ABSTRACT

A current-sharing supply circuit includes a current providing circuit, a first output rectifier circuit, a second output rectifier circuit, a first current-sharing transformer, a second current-sharing transformer, a first current-sharing circuit and a second current-sharing circuit. By adjusting the equivalent impedance values of the first current-sharing circuit, the second current-sharing circuit, the primary winding coil of the first current-sharing transformer and the primary winding coil of the second current-sharing transformer, the first output current and the second output current are substantially identical.

20 Claims, 6 Drawing Sheets

CURRENT-SHARING SUPPLY CIRCUIT FOR DRIVING MULTIPLE SETS OF DC LOADS

FIELD OF THE INVENTION

The present invention relates to a current-sharing supply circuit, and more particularly to a current-sharing supply circuit for driving multiple sets of DC loads.

BACKGROUND OF THE INVENTION

In recent years, light emitting diodes (LEDs) capable of emitting light with high luminance and high illuminating efficiency have been developed. In comparison with a common incandescent light, a LED has lower power consumption, long service life, and quick response speed. With the maturity of the LED technology, LEDs will replace all conventional lighting facilities. Until now, LEDs are widely used in many aspects of daily lives, such as automobile lighting devices, handheld lighting devices, backlight sources for LCD panels, traffic lights, indicator board displays, and the like.

When an electronic device (e.g. a LCD panel) having multiple LED strings is operated, the currents passing through all LED strings shall be identical for a purpose of obtaining uniform brightness. Due to different inherent characteristics of these LED strings, the currents passing therethrough are not identical and the brightness is usually not uniform. Therefore, the use life of individual LED string is shortened or even the whole electronic device has a breakdown.

Generally, the LED can be considered as a DC load. When an electronic device (e.g. a LCD panel) having multiple LED strings is operated, the currents passing through all LED strings shall be identical for a purpose of obtaining uniform brightness. Due to different inherent characteristics of these LED strings, the currents passing these LED strings are not identical and the brightness is usually not uniform. Therefore, the use life of individual LED string is shortened or even the whole electronic device has a breakdown.

For obtaining uniform brightness of multiple LED strings, several current-sharing techniques have been disclosed. For example, as shown in FIG. 1, U.S. Pat. No. 6,621,235 disclosed a current-sharing supply circuit for driving multiple LED strings. The current-sharing supply circuit of FIG. 1 principally includes a linear regulator 11, a low-pass filter 12 and multiple current mirrors $M_1 \sim M_n$. A constant reference current $I_{ref}$ is inputted into a first terminal of the linear regulator 11. The linear regulator 11 is controlled with the constant reference current $I_{ref}$ and thus an output voltage is generated and transmitted to the low-pass filter 12. The output voltage is filtered by the low-pass filter 12 and then transmitted to the gates of the current mirrors $M_1 \sim M_n$. As a consequence, these current mirrors $M_1 \sim M_n$ outputs identical currents. In other words, the LED strings linked to the current mirrors $M_1 \sim M_n$ have the same current and brightness.

The conventional current-sharing supply circuit for driving multiple LED strings, however, still has some drawbacks. For example, since the linear regulator and the current mirrors are employed, the conventional current-sharing supply circuit has high power loss but low operating efficiency. In addition, since more components are used, the conventional current-sharing supply circuit is very complicated.

There is a need of providing an improved current-sharing supply circuit for driving multiple sets of DC loads to obviate the drawbacks encountered from the prior art.

SUMMARY OF THE INVENTION

It is an object of the present invention to provide a current-sharing supply circuit for driving multiple sets of DC loads, in which the currents passing through all sets of DC loads are identical.

Another object of the present invention provides a current sharing supply circuit for driving multiple sets of DC loads, in which the current sharing supply circuit has minimized power loss, high operating efficiency and simplified circuitry configuration.

A further object of the present invention provides a current sharing supply circuit for driving multiple sets of DC loads, in which the overall volume of the current-sharing supply circuit is reduced but the circuitry density is enhanced.

In accordance with a first aspect of the present invention, there is provided a current-sharing supply circuit for driving a first set of DC loads and a second set of DC loads. The current-sharing supply circuit includes a current providing circuit, a first output rectifier circuit, a second output rectifier circuit, a first current-sharing transformer, a second current-sharing transformer, a first current-sharing circuit and a second current-sharing circuit. The current providing circuit is used for receiving an input voltage and generating a driving current or a driving voltage. The first output rectifier circuit is connected with the first set of DC loads for rectification, thereby generating a first output current to the first set of DC loads. The second output rectifier circuit is connected with the second set of DC loads for rectification, thereby generating a second output current to the second set of DC loads. The first current-sharing transformer has a secondary winding coil connected with the first output rectifier circuit. The second current-sharing transformer has a secondary winding coil connected with the second output rectifier circuit. The first current-sharing circuit is serially connected with a primary winding coil of the first current-sharing transformer and output terminals of the current providing circuit. The second current-sharing circuit is serially connected with a primary winding coil of the second current-sharing transformer and output terminals of the current providing circuit. By adjusting the equivalent impedance values of the first current-sharing circuit, the second current-sharing circuit, the primary winding coil of the first current-sharing transformer and the primary winding coil of the second current-sharing transformer, the first output current and the second output current are substantially identical.

In accordance with a second aspect of the present invention, there is provided a current-sharing supply circuit for driving multiple sets of DC loads. The current-sharing supply circuit includes a current providing circuit, multiple output rectifier circuits, multiple current-sharing transformer sets, and multiple current-sharing circuits. The current providing circuit is used for receiving an input voltage and generating a driving current or a driving voltage. The output rectifier circuits are connected with respective set of DC loads for rectification, thereby generating respective output currents to respective set of DC loads. Each current-sharing transformer set comprises a plurality of current-sharing transformers, which are arranged in at least one layer, and secondary winding coils of the last layer of current-sharing transformers are connected with corresponding output rectifier circuits. Each current-sharing circuit and primary winding coils of the first layer of current-sharing transformers of a corresponding current-sharing transformer set are serially connected with an output terminal of the current providing circuit. By adjusting the equivalent impedance values of the current-sharing circuits and the primary winding coils of serially-connected current-sharing transformers of the first layers of corresponding current-sharing transformer sets, the output currents are substantially identical.

In accordance with a third aspect of the present invention, there is provided a current-sharing supply circuit for driving multiple sets of DC loads. The current-sharing supply circuit includes a current providing circuit, multiple output rectifier circuits, multiple current-sharing transformer sets, and multiple current-sharing circuits. The current providing circuit is used for receiving an input voltage and generating a driving current or a driving voltage. The output rectifier circuits are connected with respective set of DC loads for rectification, thereby generating respective output currents to respective set of DC loads. Each current-sharing transformer set includes multiple current-sharing transformers, and secondary winding coils of the current-sharing transformers are connected with respective output rectifier circuits. Each current-sharing circuit and primary winding coils of the current-sharing transformers of a corresponding current-sharing transformer set are serially connected with an output terminal of the current providing circuit. By adjusting the equivalent impedance values of the current-sharing circuits and the primary winding coils of serially-connected current-sharing transformers of the corresponding current-sharing transformer sets, the output currents are substantially identical.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
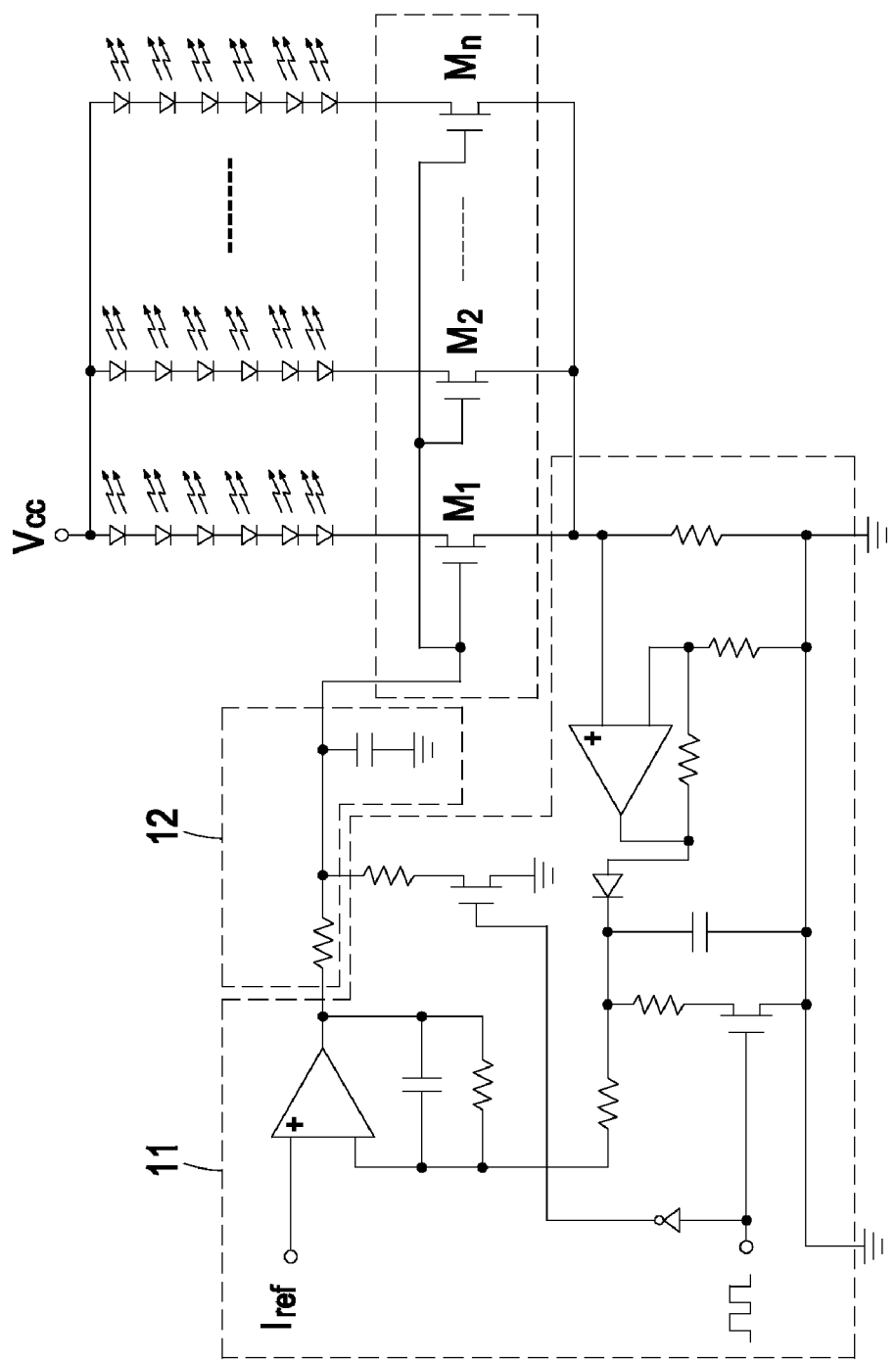
FIG. 1 is a schematic circuit diagram of a current-sharing supply circuit for driving multiple LED strings according to the prior art.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention relates to a current-sharing supply circuit for driving multiple sets of DC loads, so that all sets of DC loads have the same brightness values. The multiple sets of DC loads include for example multiple LED strings. Each LED string includes a plurality of LEDs. For clarification, two LED strings, each of which has three LEDs, are shown in the drawings.

Figure 2:
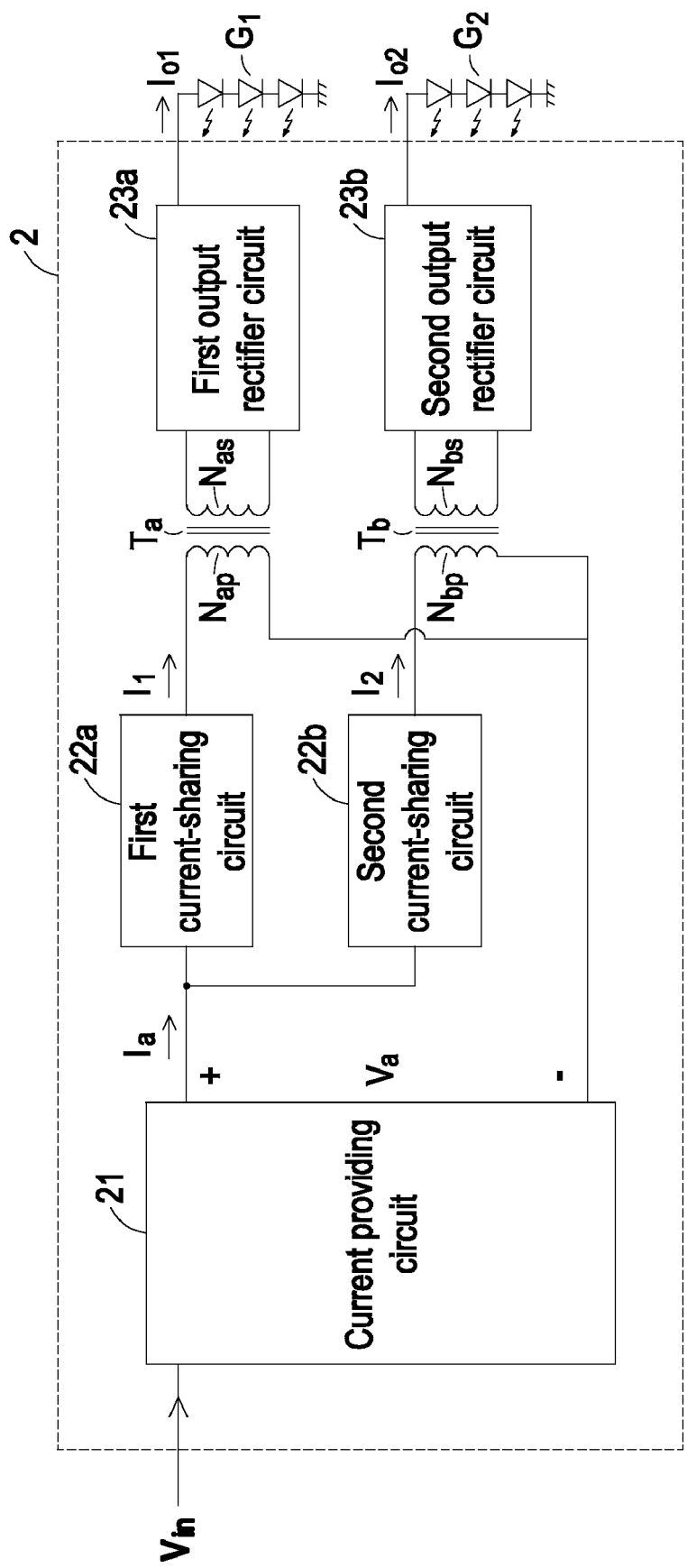
FIG. 2 is a schematic circuit block diagram of a current-sharing supply circuit for driving multiple sets of DC loads according to an embodiment of the present invention.

FIG. 2 is a schematic circuit block diagram of a current-sharing supply circuit for driving multiple sets of DC loads according to an embodiment of the present invention. The current-sharing supply circuit 2 is used for driving a first LED string $G_1$ and a second LED string $G_2$. As shown in FIG. 2, the current-sharing supply circuit 2 comprises a current providing circuit 21, a first current-sharing circuit 22a, a second current-sharing circuit 22b, a first current-sharing transformer $T_a$, a second current-sharing transformer $T_b$, a first output rectifier circuit 23a and a second output rectifier circuit 23b.

The current providing circuit 21 is used for receiving an input DC voltage $V_{in}$ and generating a driving current $I_a$ or a driving voltage $V_a$. The first current-sharing circuit 22a, the primary winding coil $N_{ap}$ of the first current-sharing transformer $T_a$ and the output terminals of the current providing circuit 21 are connected with each other in series, thereby collectively defining a first current loop. The second current-sharing circuit 22b, the primary winding coil $N_{bp}$ of the second current-sharing transformer $T_b$ and the output terminals of the current providing circuit 21 are connected with each other in series, thereby collectively defining a second current loop.

The input terminal of the first output rectifier circuit 23a is connected with the secondary winding coil $N_{as}$ of the first current-sharing transformer $T_a$. The input terminal of the second output rectifier circuit 23b is connected with the secondary winding coil $N_{bs}$ of the second current-sharing transformer $T_b$.

The output terminal of the first output rectifier circuit 23a is connected with a first end of the first LED string $G_1$ for rectifying the induction voltage of the secondary winding coil $N_{as}$ of the first current-sharing transformer $T_a$ and generating a first output current $Io_1$ to the first LED string $G_1$. The output terminal of the second output rectifier circuit 23b is connected with a first end of the second LED string $G_2$ for rectifying the induction voltage of the secondary winding coil $N_{bs}$ of the second current-sharing transformer $T_b$ and generating a second output current $Io_2$ to the second LED string $G_2$.

The first current-sharing circuit 22a receives the driving current $I_a$ and outputs a first current $I_1$. The second current-sharing circuit 22b receives the driving current $I_a$ and outputs a second current $I_2$. In the first current loop, the magnitudes of the first current $I_1$ and the first output current $Io_1$ are dependent on the sum of the equivalent impedance value of the first current-sharing circuit 22a and the equivalent impedance value of the primary winding coil $N_{ap}$ of the first current-sharing transformer $T_a$. In the second current loop, the magnitudes of the second current $I_2$ and the second output current $Io_2$ are dependent on the sum of the equivalent impedance value of the second current-sharing circuit 22b and the equivalent impedance value of the primary winding coil $N_{bp}$ of the second current-sharing transformer $T_b$. By adjusting the equivalent impedance value of the first current-sharing circuit 22a and the equivalent impedance value of the second current-sharing circuit 22b, the sum of the equivalent impedance value of the first current-sharing circuit 22a and the equivalent impedance value of the primary winding coil $N_{ap}$ of the first current-sharing transformer $T_a$ could be equal to the sum of the equivalent impedance value of the second current-sharing circuit 22b and the equivalent impedance value of the primary winding coil $N_{bp}$ of the second current-sharing transformer $T_b$. Under this circumstance, even if the impedance value properties of the first LED string $G_1$ and the second LED string $G_2$ are different, the magnitudes of the first current $I_1$ and the second current $I_2$ could be equal. In other words, the magnitudes of the first output current $Io_1$ and the second output current $Io_2$ could be equal. As such, all sets of DC loads have the same brightness values.

In accordance with a key feature of the present invention, by adjusting the equivalent impedance values of the first current-sharing circuit 22a, the second current-sharing circuit 22b, the primary winding coil of the first current-sharing transformer $T_a$ and the primary winding coil of the second current-sharing transformer $T_b$, the magnitudes of the first output current $Io_1$ and the second output current $Io_2$ are substantially identical. As such, the magnitudes of the first current $I_1$ and the second current $I_2$ are equal. As known, for different LEDs, the relations between the brightness values and the currents are somewhat different. Generally, if the difference between the first output current $Io_1$ and the second output current $Io_2$ is in the range of from −10% to +10%, the brightness difference between the first LED string $G_1$ and the second LED string $G_2$ is very tiny. In this context, the first output current $Io_1$ and the second output current $Io_2$ are considered to be substantially identical if the difference between the first output current $Io_1$ and the second output current $Io_2$ is in the range of from −10% to +10%. Alternatively, the first current $I_1$ and the second current $I_2$ are considered to be substantially identical if the difference between the first current $I_1$ and the second current $I_2$ is in the range of from −10% to +10%. In some embodiments where the brightness variation is relative large, the first output current $Io_1$ and the second output current $Io_2$ are considered to be substantially identical if the difference between the first output current $Io_1$ and the second output current $Io_2$ is in the range of from −5% to +5%, or the first current $I_1$ and the second current $I_2$ are considered to be substantially identical if the difference between the first current $I_1$ and the second current $I_2$ is in the range of from −5% to +5%.

In the first current loop, the equivalent impedance value of the first current-sharing circuit 22a is greater than the equivalent impedance value of the primary winding coil $N_{ap}$ of the first current-sharing transformer $T_a$. As such, the magnitude of the first current $I_1$ is dependent on the equivalent impedance value of the first current-sharing circuit 22a. In the second current loop, the equivalent impedance value of the second current-sharing circuit 22b is greater than the equivalent impedance value of the primary winding coil $N_{bp}$ of the second current-sharing transformer $T_b$. As such, the magnitude of the second current $I_2$ is dependent on the equivalent impedance value of the second current-sharing circuit 22b.

In this embodiment, the turn ratio of the first current-sharing transformer $T_a$ is equal to the turn ratio of the second current-sharing transformer $T_b$. The equivalent impedance value of the first current-sharing circuit 22a is more than ten times of the equivalent impedance value of the primary winding coil $N_{ap}$ of the first current-sharing transformer $T_a$. The equivalent impedance value of the second current-sharing circuit 22b is more than ten times of the equivalent impedance value of the primary winding coil $N_{bp}$ of the second current-sharing transformer $T_b$. In addition, the equivalent impedance value of the first current-sharing circuit 22a is equal to the equivalent impedance value of the second current-sharing circuit 22b. Under this circumstance, even if the impedance value properties of the first LED string $G_1$ and the second LED string $G_2$ are different, the magnitudes of the first current $I_1$ and the second current $I_2$ could be equal. In other words, the magnitudes of the first output current $Io_n$ and the second output current $Io_2$ could be equal. As such, all sets of DC loads have the same brightness values.

Figure 3:
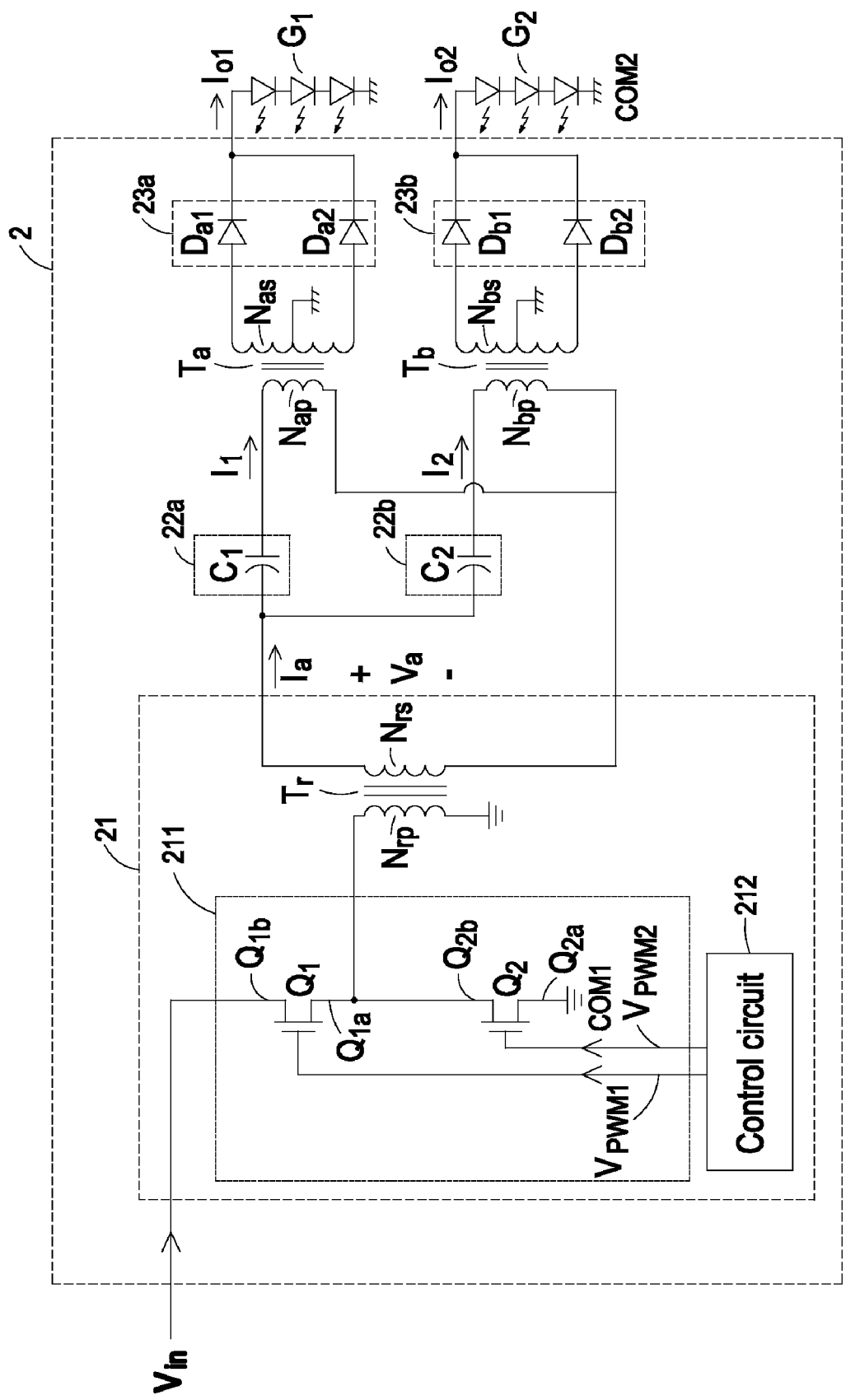
FIG. 3 is a schematic detailed circuit diagram illustrating the current-sharing supply circuit shown in FIG. 2.

FIG. 3 is a schematic detailed circuit diagram illustrating the current-sharing supply circuit shown in FIG. 2. The current providing circuit 21 comprises a switching circuit 211, a control circuit 212 and an isolation transformer $T_r$. The power output terminal of the switching circuit 211 is connected with a primary winding coil $N_{rp}$ of the isolation transformer $T_r$. The control terminal of the switching circuit 211 is connected with the control circuit 212. By the switching circuit 211, the electrical energy of the input DC voltage $V_{in}$ is selectively transmitted to the primary winding coil $N_{rp}$ of the isolation transformer $T_r$ through the switching circuit 211 according to a first pulse width modulation signal $V_{PWM1}$ and a second pulse width modulation signal $V_{PWM2}$ that are outputted from the control circuit 212.

In this embodiment, the switching circuit 211 comprises a first switch element $Q_1$ and a second switch element $Q_2$. A first end $Q_{1a}$ of the first switch element $Q_1$ is connected with a first end of the primary winding coil $N_{rp}$ and a second end $Q_{2b}$ of the second switch element $Q_2$. A first end $Q_{2a}$ of the second switch element $Q_2$ is connected with a first common terminal $COM_1$. The second end of the primary winding coil $N_{rp}$ is also connected with the first common terminal $COM_1$. The control terminals of the first switch element $Q_1$ and the second switch element $Q_2$ are connected with the control circuit 212. Under control of the control circuit 212, the first switch element $Q_1$ and the second switch element $Q_2$ are selectively conducted or shut off according to the first pulse width modulation signal $V_{PWM1}$ and the second pulse width modulation signal $V_{PWM2}$, respectively. As a consequence, the electrical energy of the input DC voltage $V_{in}$ is selectively transmitted to the primary winding coil $N_{rp}$ of the isolation transformer $T_r$ through the second end $Q_{1b}$ of the first switch element $Q_1$ or the first end $Q_{2a}$ of the second switch element $Q_2$. In addition, both ends of the primary winding coil $N_{rp}$ of the isolation transformer $T_r$ are subject to a voltage variation. Due to the voltage variation, a secondary winding coil $N_{rs}$ of the isolation transformer $T_r$ generates the driving current $I_a$ or the driving voltage $V_a$.

In this embodiment, the first output rectifier circuit 23a comprises a first main diode $D_{a1}$ and a first minor diode $D_{a2}$, and the second output rectifier circuit 23b comprises a second main diode $D_{b2}$ and a second minor diode $D_{b2}$. Both ends of the secondary winding coil $N_{as}$ of the first current-sharing transformer $T_a$ are respectively connected with the anodes of the first main diode $D_{a1}$ and the first minor diode $D_{a2}$. The cathodes of the first main diode $D_{a1}$ and the first minor diode $D_{a2}$ are connected with an anode of the first LED string $G_1$. The cathode of the first LED string $G_1$ and the center-tapped head of the secondary winding coil $N_{as}$ of the first current-sharing transformer $T_a$ are connected with a second command terminal $COM_2$. Both ends of the secondary winding coil $N_{bs}$ of the second current-sharing transformer $T_b$ are respectively connected with the anodes of the second main diode $D_{b1}$ and the second minor diode $D_{b2}$. The cathodes of the second main diode $D_{b1}$ and the second minor diode $D_{b2}$ are connected with an anode of the second LED string $G_2$. The cathode of the second LED string $G_2$ and the center-tapped head of the secondary winding coil $N_{bs}$ of the second current-sharing transformer $T_b$ are connected with the second command terminal $COM_2$.

The first current-sharing circuit 22a comprises a first capacitive passive element (e.g. a first capacitor $C_1$). The second current-sharing circuit 22b comprises a second capacitive passive element (e.g. a second capacitor $C_2$). The first capacitor $C_1$, the primary winding coil $N_{ap}$ of the first current-sharing transformer $T_a$ and the output terminals of the current providing circuit 21 are connected with each other, thereby collectively defining a first current loop. The second capacitor $C_2$, the primary winding coil $N_{bp}$ of the second current-sharing transformer $T_b$ and the output terminals of the current providing circuit 21 are connected with each other, thereby collectively defining a second current loop. Since the first current-sharing circuit 22a and the second current-sharing circuit 22b are capacitive impedances, the capacitance value of one of the first current-sharing circuit 22a and the second current-sharing circuit 22b could be adjusted without any power consumption. Under this circumstance, the magnitudes of the first current $I_1$ and the second current $I_2$ are adjustable.

In the first current loop, the equivalent impedance value of the first current-sharing circuit 22a is greater than the equivalent impedance value of the primary winding coil $N_{ap}$ of the first current-sharing transformer $T_a$. As such, the magnitude of the first current $I_1$ is dependent on the equivalent impedance value of the first current-sharing circuit 22a. In the second current loop, the equivalent impedance value of the second current-sharing circuit 22b is greater than the equivalent impedance value of the primary winding coil $N_{bp}$ of the second current-sharing transformer $T_b$. As such, the magnitude of the second current $I_2$ is dependent on the equivalent impedance value of the second current-sharing circuit 22b.

In this embodiment, the turn ratio of the first current-sharing transformer $T_a$ is equal to the turn ratio of the second current-sharing transformer $T_b$. The equivalent impedance value of the first current-sharing circuit 22a is more than ten times of the equivalent impedance value of the primary winding coil $N_{ap}$ of the first current-sharing transformer $T_a$. The equivalent impedance value of the second current-sharing circuit 22b is more than ten times of the equivalent impedance value of the primary winding coil $N_{bp}$ of the second current-sharing transformer $T_b$. In addition, the equivalent impedance value of the first current-sharing circuit 22a is equal to the equivalent impedance value of the second current-sharing circuit 22b. Under this circumstance, even if the impedance value properties of the first LED string $G_1$ and the second LED string $G_2$ are different, the magnitudes of the first current $I_1$ and the second current $I_2$ could be equal. In other words, the magnitudes of the first output current $Io_1$ and the second output current $Io_2$ could be equal. As such, all sets of DC loads have the same brightness values.

Figure 4:
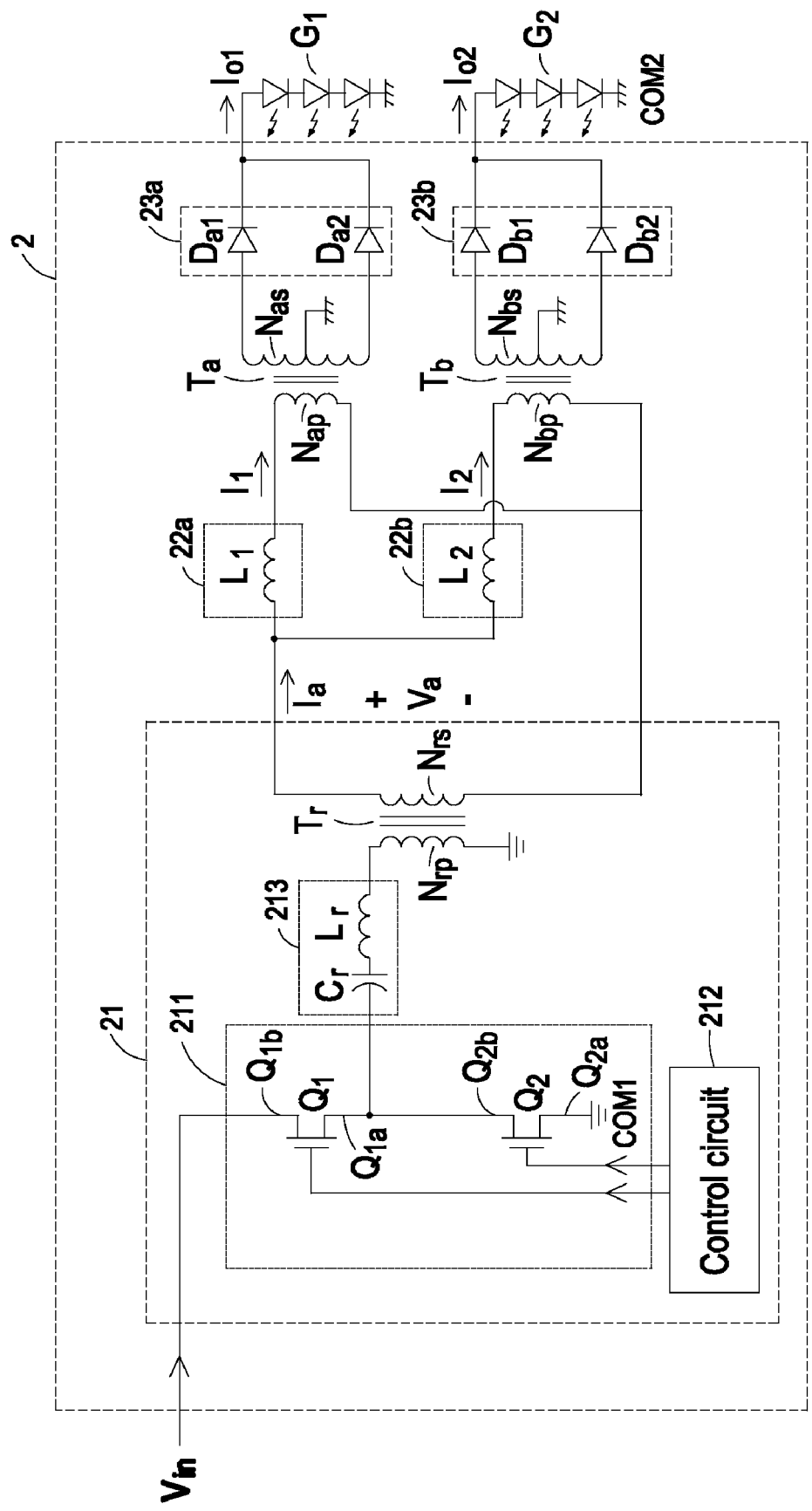
FIG. 4 is a schematic detailed circuit diagram illustrating a variant of the current-sharing supply circuit shown in FIG. 3.

FIG. 4 is a schematic detailed circuit diagram illustrating a variant of the current-sharing supply circuit shown in FIG. 3. In comparison with FIG. 3, the first current-sharing circuit 22a comprises a first inductive passive element (e.g. a first inductor $L_1$), the second current-sharing circuit 22b comprises a second inductive passive element (e.g. a second inductor $L2_1$), and the current providing circuit 21 further comprises a resonant circuit 213. The resonant circuit 213 is interconnected between the power output terminal of the switching circuit 211 and the primary winding coil $N_{rp}$ of the isolation transformer $T_r$. The resonant circuit 213 includes a resonant capacitor $C_r$ and a resonant inductor $L_r$. The resonant inductor $L_r$ and the resonant capacitor $C_r$ are serially connected with the primary winding coil $N_{rp}$ of the isolation transformer $T_r$. Since the first current-sharing circuit 22a and the second current-sharing circuit 22b are inductive impedances, the inductance value of one of the first current-sharing circuit 22a and the second current-sharing circuit 22b could be adjusted without any power consumption. Under this circumstance, the magnitudes of the first current $I_1$ and the second current $I_2$ are adjustable.

In accordance with the present invention, a resonant relation is created between the primary winding coil $N_{rp}$ of the isolation transformer $T_r$ and the resonant circuit 213. The first current-sharing transformer $T_a$, the second current-sharing transformer $T_b$ and the isolation transformer $T_r$ are designed to create a resonant relation between the primary winding coil $N_{rp}$ of the isolation transformer $T_r$ and the resonant circuit 213. The resonant frequency is for example 30 kHz. The resonant relation between the isolation transformer $T_r$ and the resonant circuit 213 has nothing to do with the first current-sharing transformer $T_a$ and the second current-sharing transformer $T_b$. In other words, the structures of first current-sharing transformer $T_a$ and the second current-sharing transformer $T_b$ could be as simply as possible. According to the magnitudes of the first output current $Io_1$ and the second output current $Io_2$, the structures of first current-sharing transformer $T_a$ and the second current-sharing transformer $T_b$ could be easily designed.

In the current-sharing supply circuit 2, the isolation effect is provided by the isolation transformer $T_r$ rather than the first current-sharing transformer $T_a$ and the second current-sharing transformer $T_b$. In other words, the first current-sharing transformer $T_a$ and the second current-sharing transformer $T_b$ could be designed as small-sized transformers without isolation effects. In other words, since the overall volume of the current-sharing supply circuit 2 is reduced but the circuitry density is enhanced, the current-sharing supply circuit 2 is feasible to be used in small-sized electronic devices (e.g. slim-type TV sets, slim-type screens or slim-type notebook computer) that have LEDs as backlight sources.

In the embodiment of FIG. 4, the turn ratio of the first current-sharing transformer $T_a$ is equal to the turn ratio of the second current-sharing transformer $T_b$. The equivalent impedance value of the first current-sharing circuit 22a is more than ten times of the equivalent impedance value of the primary winding coil $N_{ap}$ of the first current-sharing transformer $T_a$. The equivalent impedance value of the second current-sharing circuit 22b is more than ten times of the equivalent impedance value of the primary winding coil $N_{bp}$ of the second current-sharing transformer $T_b$. In addition, the equivalent impedance value of the first current-sharing circuit 22a is equal to the equivalent impedance value of the second current-sharing circuit 22b. Under this circumstance, even if the impedance value properties of the first LED string $G_1$ and the second LED string $G_2$ are different, the magnitudes of the first current $I_1$ and the second current $I_2$ could be equal. In other words, the magnitudes of the first output current $Io_1$ and the second output current $Io_2$ could be equal. As such, all sets of DC loads have the same brightness values.

Figure 5:
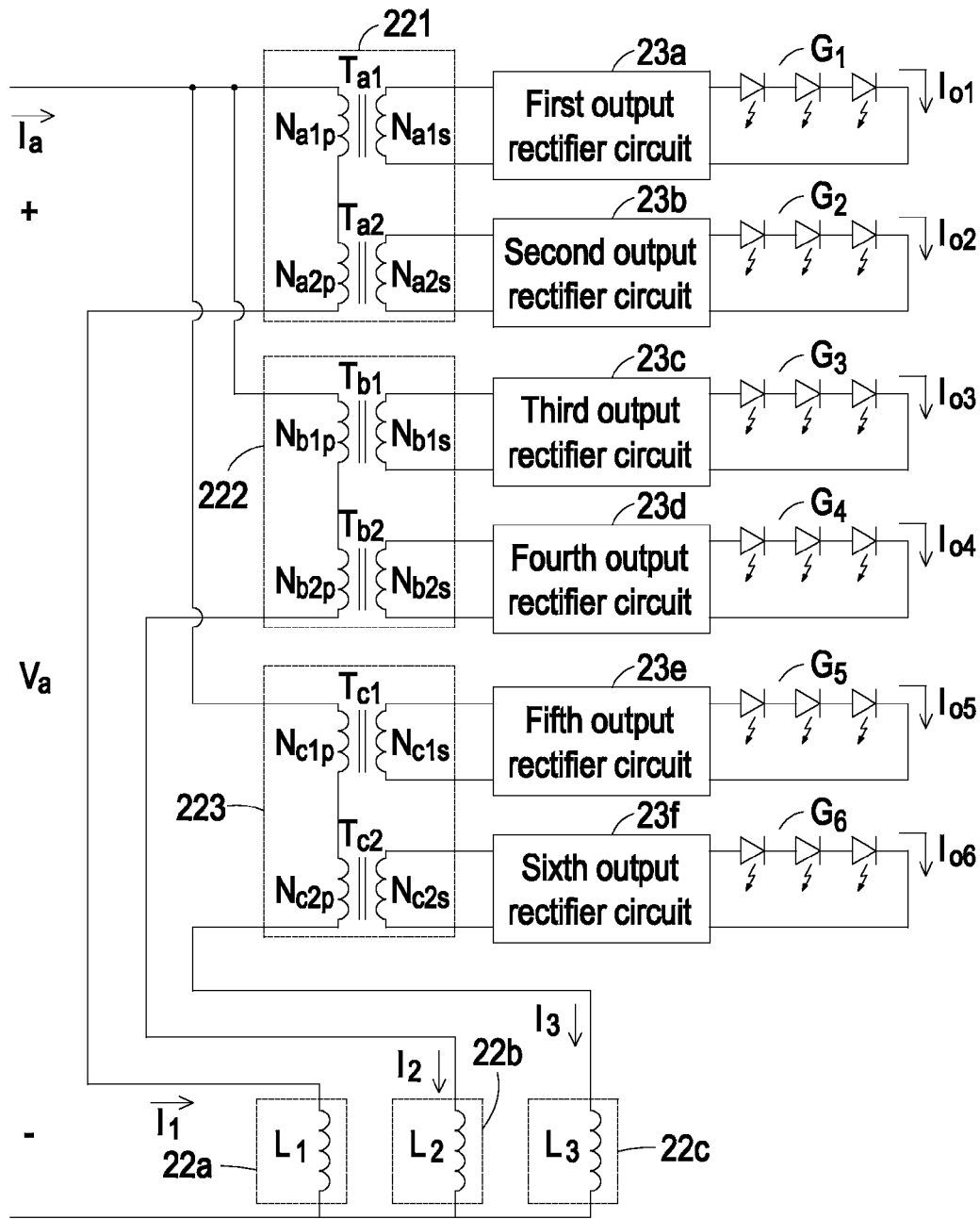
FIG. 5 is a schematic detailed circuit diagram illustrating a portion of a current-sharing supply circuit according to another embodiment of the present invention.

FIG. 5 is a schematic detailed circuit diagram illustrating a portion of a current-sharing supply circuit according to another embodiment of the present invention. As shown in FIG. 5, the current-sharing supply circuit 2 comprises a current providing circuit 21 (not shown), a first current-sharing circuit 22a, a second current-sharing circuit 22b, a third current-sharing circuit 22c, a first current-sharing transformer set 221, a second current-sharing transformer set 222, a third current-sharing transformer set 223, a first output rectifier circuit 23a, a second output rectifier circuit 23b, a third output rectifier circuit 23c, a fourth output rectifier circuit 23d, a fifth output rectifier circuit 23e and a sixth output rectifier circuit 23f. The first current-sharing transformer set 221 comprises a first current-sharing transformer $T_{a1}$ and a second current-sharing transformer $T_{a2}$. The second current-sharing transformer set 222 comprises a first current-sharing transformer $T_{b1}$ and a second current-sharing transformer $T_{b2}$. The third current-sharing transformer set 223 comprises a first current-sharing transformer $T_{c1}$ and a second current-sharing transformer $T_{c2}$.

In this embodiment, the first current-sharing circuit 22a comprises a first inductor $L_1$, the second current-sharing circuit 22b comprises a second inductor $L_2$, and the third current-sharing circuit 22c comprises a third inductor $L_3$. The first current-sharing circuit 22a, the primary winding coil $N_{a1p}$ of the first current-sharing transformer $T_{a1}$ and the primary winding coil $N_{a2p}$ of the second current-sharing transformer $T_{a2}$ are serially connected with the power output terminal of the current providing circuit 21 (not shown), thereby collectively defining a first current loop. The second current-sharing circuit 22b, the primary winding coil $N_{b1p}$ of the first current-sharing transformer $T_{b1}$ and the primary winding coil $N_{b2p}$ of the second current-sharing transformer $T_{b2}$ are serially connected with the power output terminal of the current providing circuit 21 (not shown), thereby collectively defining a second current loop. The third current-sharing circuit 22c, the primary winding coil $N_{c1p}$ of the first current-sharing transformer $T_{c1}$ and the primary winding coil $N_{c2p}$ of the second current-sharing transformer $T_{c2}$ are serially connected with the power output terminal of the current providing circuit 21 (not shown), thereby collectively defining a third current loop.

The input terminals and the output terminals of the first output rectifier circuit 23a are respectively connected with the secondary winding coil $N_{a1s}$ of the first current-sharing transformer $T_{a1}$ and the first LED string $G_1$. The input terminals and the output terminals of the second output rectifier circuit 23b are respectively connected with the secondary winding coil $N_{a2s}$ of the second current-sharing transformer $T_{a2}$ and the second LED string $G_2$. The input terminals and the output terminals of the third output rectifier circuit 23c are respectively connected with the secondary winding coil $N_{b1s}$ of the first current-sharing transformer $T_{b1}$ and the third LED string $G_3$. The input terminals and the output terminals of the fourth output rectifier circuit 23d are respectively connected with the secondary winding coil $N_{b2s}$ of the second current-sharing transformer $T_{b2}$ and the fourth LED string $G_4$. The input terminals and the output terminals of the fifth output rectifier circuit 23e are respectively connected with the secondary winding coil $N_{c1s}$ of the first current-sharing transformer $T_{c1}$ and the fifth LED string $G_5$. The input terminals and the output terminals of the sixth output rectifier circuit 23f are respectively connected with the secondary winding coil $N_{c2s}$ of the second current-sharing transformer $T_{c2}$ and the sixth LED string $G_6$.

In the first current loop, the equivalent impedance value of the first current-sharing circuit 22a is greater than the equivalent impedance value of the serially-connected primary winding coils $N_{a1p}$ and $N_{a2p}$ of the current-sharing transformers $T_{a1}$ and $T_{a2}$. As such, the magnitude of the first current $I_1$ is dependent on the equivalent impedance value of the first current-sharing circuit 22a. In the second current loop, the equivalent impedance value of the second current-sharing circuit 22b is greater than the equivalent impedance value of the serially-connected primary winding coils $N_{b1p}$ and $N_{b2p}$ of the current-sharing transformers $T_{b1}$ and $T_{b2}$. As such, the magnitude of the second current $I_2$ is dependent on the equivalent impedance value of the second current-sharing circuit 22b. In the third current loop, the equivalent impedance value of the third current-sharing circuit 22c is greater than the equivalent impedance value of the serially-connected primary winding coils $N_{c1p}$ and $N_{c2p}$ of the current-sharing transformers $T_{c1}$ and $T_{c2}$. As such, the magnitude of the third current $I_3$ is dependent on the equivalent impedance value of the third current-sharing circuit 22c.

In this embodiment, the turn ratios of all current-sharing transformers are identical. For each current loop, the equivalent impedance value of each current-sharing circuit is more than ten times of the equivalent impedance value of the serially-connected current-sharing transformers of a corresponding current-sharing transformer set. The equivalent impedance values of all current-sharing circuit are identical. Under this circumstance, even if the impedance value properties of the LED strings $G_1 \sim G_6$ are different, magnitudes of the first current $I_1$, the second current $I_2$, the third current $I_3$, the fourth current $I_4$, the fifth current $I_5$ and the sixth current $I_6$ are nearly identical. As such, all sets of DC loads have the same brightness values.

Figure 6:
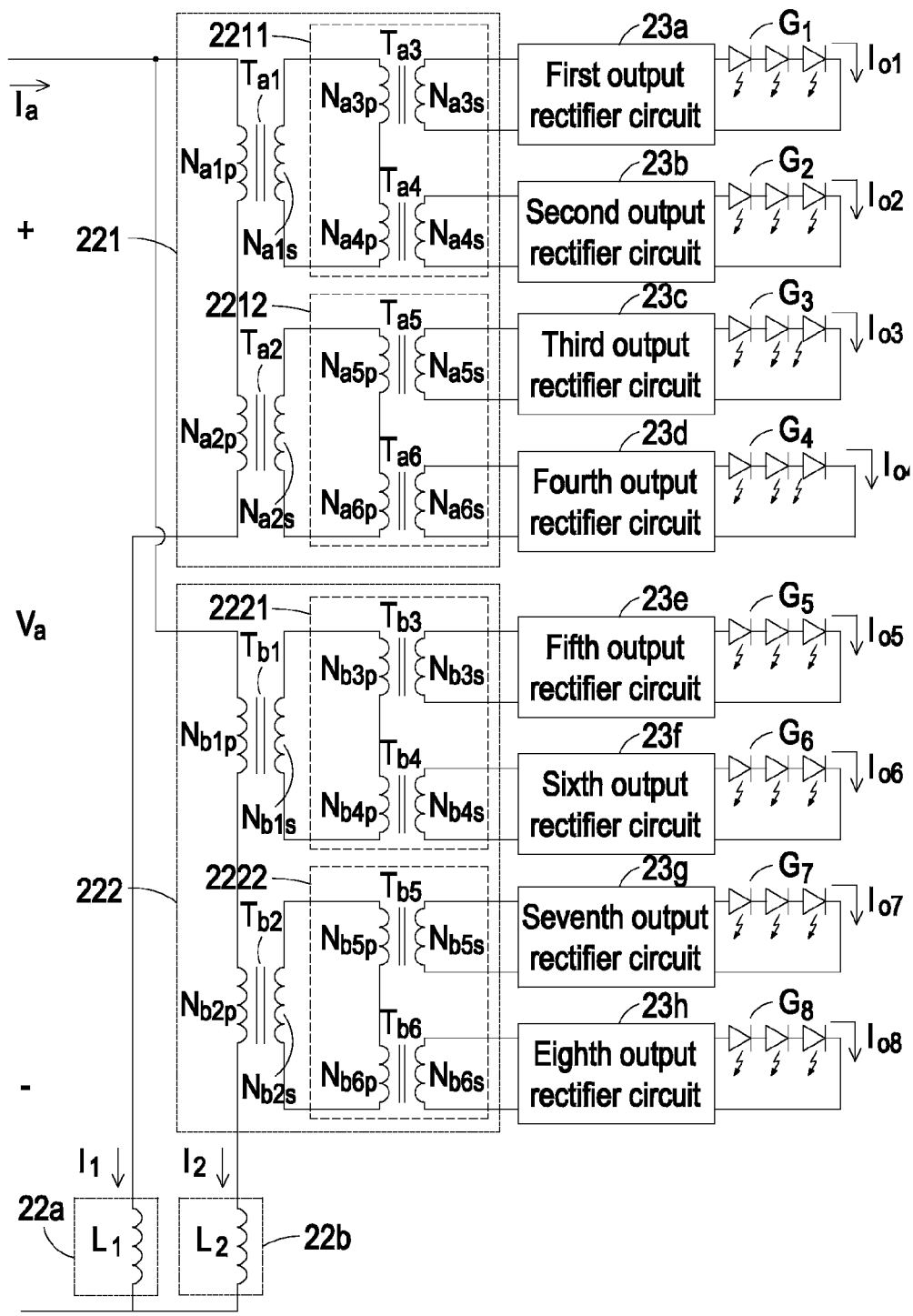
FIG. 6 is a schematic detailed circuit diagram illustrating a portion of a current-sharing supply circuit according to another embodiment of the present invention.

FIG. 6 is a schematic detailed circuit diagram illustrating a portion of a current-sharing supply circuit according to another embodiment of the present invention. As shown in FIG. 6, the current-sharing supply circuit 2 comprises a current providing circuit 21 (not shown), a first current-sharing circuit 22a, a second current-sharing circuit 22b, a first current-sharing transformer set 221, a second current-sharing transformer set 222, a first output rectifier circuit 23a, a second output rectifier circuit 23b, a third output rectifier circuit 23c, a fourth output rectifier circuit 23d, a fifth output rectifier circuit 23e, a sixth output rectifier circuit 23f, a seventh output rectifier circuit 23g and an eighth output rectifier circuit 23h. Each of the first current-sharing transformer set 221 and the second current-sharing transformer set 222 comprises multiple current-sharing transformers, which are arranged in at least one layer.

In this embodiment, each of the first current-sharing transformer set 221 and the second current-sharing transformer set 222 comprises multiple current-sharing transformers, which are arranged in two layers. The first layer of the first current-sharing transformer set 221 comprises a first current-sharing transformer $T_{a1}$ and a second current-sharing transformer $T_{a2}$. The primary winding coil $N_{a1p}$ of the first current-sharing transformer $T_{a1}$, the primary winding coil $N_{a2p}$ of the second current-sharing transformer $T_{a2}$ and the first current-sharing circuit 22a are serially connected with the output terminal (not shown) of the current providing circuit 21, thereby collectively defining the first current loop. The secondary winding coil $N_{a1s}$ of the first current-sharing transformer $T_{a1}$ is connected with a first current-sharing branch 2211. The secondary winding coil $N_{a2s}$ of the second current-sharing transformer $T_{a2}$ is connected with a second current-sharing branch 2212.

The second layer of the first current-sharing transformer set 221 comprises the first current-sharing branch 2211 and the second current-sharing branch 2212. The first current-sharing branch 2211 comprises a third current-sharing transformer $T_{a3}$ and a fourth current-sharing transformer $T_{a4}$. The primary winding coil $N_{a3p}$ of the third current-sharing transformer $T_{a3}$ and the primary winding coil $N_{a4p}$ of the fourth current-sharing transformer $T_{a4}$ are serially connected with the secondary winding coil $N_{a1s}$ of the first current-sharing transformer $T_{a1}$ of the former layer (i.e. the first layer). The second current-sharing branch 2212 comprises a fifth current-sharing transformer $T_{a5}$ and a sixth current-sharing transformer $T_{a6}$. The primary winding coil $N_{a5p}$ of the fifth current-sharing transformer $T_{a5}$ and the primary winding coil $N_{a6p}$ of the sixth current-sharing transformer $T_{a6}$ are serially connected with the secondary winding coil $N_{a2s}$ of the second current-sharing transformer $T_{a2}$ of the former layer.

In the last layer (i.e. the second layer) of the first current-sharing transformer set 221, the secondary winding coil $N_{a3s}$ of the third current-sharing transformer $T_{a3}$, the secondary winding coil $N_{a4s}$ of the fourth current-sharing transformer $T_{a4}$, the secondary winding coil $N_{a5s}$ of the fifth current-sharing transformer $T_{a5}$ and the secondary winding coil $N_{a6s}$ of the sixth current-sharing transformer $T_{a6}$ are respectively connected with the first output rectifier circuit 23a, the second output rectifier circuit 23b, the third output rectifier circuit 23c and the fourth output rectifier circuit 23d.

The second layer of the second current-sharing transformer set 222 comprises the first current-sharing branch 2221 and the second current-sharing branch 2222. The first current-sharing branch 2221 comprises a third current-sharing transformer $T_{b3}$ and a fourth current-sharing transformer $T_{b4}$. The primary winding coil $N_{b3p}$ of the third current-sharing transformer $T_{b3}$ and the primary winding coil $N_{b4p}$ of the fourth current-sharing transformer $T_{b4}$ are serially connected with the secondary winding coil $N_{b1s}$ of the first current-sharing transformer $T_{b1}$ of the former layer (i.e. the first layer). The second current-sharing branch 2222 comprises a fifth current-sharing transformer $T_{b5}$ and a sixth current-sharing transformer $T_{b6}$. The primary winding coil $N_{b5p}$ of the fifth current-sharing transformer $T_{b5}$ and the primary winding coil $N_{b6p}$ of the sixth current-sharing transformer $T_{b6}$ are serially connected with the secondary winding coil $N_{b2s}$ of the second current-sharing transformer $T_{b2}$ of the former layer.

In the last layer (i.e. the second layer) of the second current-sharing transformer set 222, the secondary winding coil $N_{b3s}$ of the third current-sharing transformer $T_{b3}$, the secondary winding coil $N_{b4s}$ of the fourth current-sharing transformer $T_{b4}$, the secondary winding coil $N_{b5s}$ of the fifth current-sharing transformer $T_{b5}$ and the secondary winding coil $N_{b6s}$ of the sixth current-sharing transformer $T_{b6}$ are respectively connected with the fifth output rectifier circuit 23e, the sixth output rectifier circuit 23f, the seventh output rectifier circuit 23g and the eighth output rectifier circuit 23h.

In this embodiment, the equivalent impedance value of each current-sharing circuit is greater than the equivalent impedance value of the primary winding coils of the serially-connected current-sharing transformers of the first layer of a corresponding current-sharing transformer set. As such, the first current $I_1$ passing through the first layer of the first current-sharing transformer set 221 is equal to the second current $I_2$ passing through the first layer of the second current-sharing transformer set 222. Correspondingly, the current passing through each layer of the first current-sharing transformer set 221 is substantially equal to the current passing through each layer of the second current-sharing transformer set 222. Under this circumstance, the magnitudes of the current $I_1$~$I_8$ are nearly identical, and thus all sets of DC loads have the same brightness values.

In some embodiments, the turn ratio of the primary winding coil to the secondary winding coil for each current-sharing transformer is equal to 1:1. Alternatively, the turn ratio of the primary winding coil to the secondary winding coil for each current-sharing transformer is adjusted according to the output current. In the above embodiments, an example of the first switch element $Q_1$ or the second switch element $Q_2$ includes but is not limited to a metal oxide semiconductor field effect transistor (MOSFET) or a bipolar junction transistor (BJT). An example of the control circuit 212 includes but is not limited to a digital signal processor (DSP), a micro processor, a pulse width modulation (PWM) controller, or a pulse frequency modulation (PFM) controller. An example of each output rectifier circuit includes but is not limited to a bridge rectifier circuit, a full-wave rectifier circuit or a half-wave rectifier circuit.

From the above embodiment, the current-sharing supply circuit of the present invention is capable of balancing the currents passing through all sets of DC loads and thus all sets of DC loads have the same brightness values. In addition, since the circuitry configuration is simplified, the current-sharing supply circuit of the present invention has reduced number of components, more cost-effective, reduced power loss and high operating efficiency.

Moreover, since the current-sharing transformers are not restricted by the resonant relation between the resonant circuit and the isolation transformer, the current-sharing transformers could be designed as small-sized transformers. Since the overall volume of the current-sharing supply circuit is reduced but the circuitry density is enhanced, the current-sharing supply circuit is feasible to be used in small-sized electronic devices (e.g. slim-type TV sets, slim-type screens or slim-type notebook computer) that have LEDs as backlight sources.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A current-sharing supply circuit for driving a first set of DC loads and a second set of DC loads, said current-sharing supply circuit comprising:
    a current providing circuit for receiving an input voltage and generating a driving current or a driving voltage;
    a first output rectifier circuit connected with said first set of DC loads for rectification, thereby generating a first output current to said first set of DC loads;
    a second output rectifier circuit connected with said second set of DC loads for rectification, thereby generating a second output current to said second set of DC loads;
    a first current-sharing transformer having a secondary winding coil connected with said first output rectifier circuit;
    a second current-sharing transformer having a secondary winding coil connected with said second output rectifier circuit;
    a first current-sharing circuit serially connected with a primary winding coil of said first current-sharing transformer and output terminals of said current providing circuit; and
    a second current-sharing circuit serially connected with a primary winding coil of said second current-sharing transformer and output terminals of said current providing circuit;
    wherein said first output current and said second output current are substantially identical by adjusting the equivalent impedance values of said first current-sharing circuit, said second current-sharing circuit, said primary winding coil of said first current-sharing transformer and said primary winding coil of said second current-sharing transformer.

2. The current-sharing supply circuit according to claim 1 wherein the equivalent impedance value of said first current-sharing circuit is greater than the equivalent impedance value of said primary winding coil of said first current-sharing transformer, and the equivalent impedance value of said second current-sharing circuit is greater than the equivalent impedance value of said primary winding coil of said second current-sharing transformer.

3. The current-sharing supply circuit according to claim 1 wherein the sum of the equivalent impedance value of said first current-sharing circuit and the equivalent impedance value of said primary winding coil of said first current-sharing transformer is equal to the sum of the equivalent impedance value of said second current-sharing circuit and the equivalent impedance value of said primary winding coil of said second current-sharing transformer.

4. The current-sharing supply circuit according to claim 1 wherein each of said first current-sharing circuit and said second current-sharing circuit comprises a capacitive passive element.

5. The current-sharing supply circuit according to claim 4 wherein said first current-sharing circuit and said second current-sharing circuit comprises a first capacitor and a second capacitor, respectively.

6. The current-sharing supply circuit according to claim 1 wherein each of said first current-sharing circuit and said second current-sharing circuit comprises an inductive passive element.

7. The current-sharing supply circuit according to claim 6 wherein said first current-sharing circuit and said second current-sharing circuit comprises a first inductor and a second inductor, respectively.

8. The current-sharing supply circuit according to claim 1 wherein said current providing circuit comprises:
   an isolation transformer having a secondary winding coil connected with an output terminal of said current providing circuit;
   a switching circuit having a power output terminal connected with a primary winding coil of said isolation transformer; and
   a control circuit connected with a control terminal of said switching circuit for generating at least a first pulse width modulation signal for controlling operations of said switching circuit, wherein electrical energy of said input voltage is selectively transmitted to said primary winding coil of said isolation transformer through said switching circuit according to said first pulse width modulation signal.

9. The current-sharing supply circuit according to claim 8 wherein said switching circuit comprises:
   a first switch element having a first end connected with said primary winding coil of said isolation transformer, and a control terminal connected with said control circuit; and
   a second switch element having a second end connected with said primary winding coil of said isolation transformer and a first end of said first switch element, and a control terminal connected with said control circuit, wherein said second switch element is selectively conducted or shut off according to a second pulse width modulation signal generated by said control circuit,
   wherein under control of said control circuit, said first switch element and said second switch element are selectively conducted or shut off according to said first pulse width modulation signal and said second pulse width modulation signal, so that electrical energy of said input voltage is selectively transmitted to said primary winding coil of said isolation transformer through said first switch element or said second switch element.

10. The current-sharing supply circuit according to claim 1 wherein each of said first output rectifier circuit and said second output rectifier circuit is a bridge rectifier circuit, a full-wave rectifier circuit or a half-wave rectifier circuit.

11. The current-sharing supply circuit according to claim 1 wherein said secondary winding coil of each of said first current-sharing transformer and said second current-sharing transformer has a center-tapped head.

12. The current-sharing supply circuit according to claim 1 wherein each of said first set of DC loads and said second set of DC loads includes multiple light emitting diodes.

13. A current-sharing supply circuit for driving multiple sets of DC loads, said current-sharing supply circuit comprising:
   a current providing circuit for receiving an input voltage and generating a driving current or a driving voltage;
   multiple output rectifier circuits connected with respective set of DC loads for rectification, thereby generating respective output currents to respective set of DC loads;
   multiple current-sharing transformer sets, wherein each said current-sharing transformer set comprises a plurality of current-sharing transformers arranged in at least one layer, and secondary winding coils of a last layer of said current-sharing transformers are connected with corresponding output rectifier circuits; and
   multiple current-sharing circuits, wherein each current-sharing circuit and primary winding coils of a first layer of said current-sharing transformers of a corresponding current-sharing transformer set are serially connected with an output terminal of said current providing circuit,
   wherein said output currents are substantially identical by adjusting the equivalent impedance values of said current-sharing circuits and said primary winding coils of serially-connected current-sharing transformers of first layers of corresponding current-sharing transformer sets.

14. The current-sharing supply circuit according to claim 13 wherein the equivalent impedance value of each current-sharing circuit is greater than the equivalent impedance value of said primary winding coils of serially-connected current-sharing transformers of the first layer of a corresponding current-sharing transformer set.

15. The current-sharing supply circuit according to claim 13 wherein the sum of the equivalent impedance value of each current-sharing circuit and the equivalent impedance value of said primary winding coils of serially-connected current-sharing transformers of the first layer of a corresponding current-sharing transformer set is identical for each current loop.

16. The current-sharing supply circuit according to claim 13 wherein said current providing circuit comprises:
   an isolation transformer having a secondary winding coil connected with said output terminal of said current providing circuit;
   a switching circuit having a power output terminal connected with a primary winding coil of said isolation transformer; and
   a control circuit connected with a control terminal of said switching circuit for generating at least a first pulse width modulation signal for controlling operations of said switching circuit, wherein electrical energy of said input voltage is selectively transmitted to said primary winding coil of said isolation transformer through said switching circuit according to said first pulse width modulation signal.

17. The current-sharing supply circuit according to claim 16 wherein said switching circuit comprises:
   a first switch element having a first end connected with said primary winding coil of said isolation transformer, and a control terminal connected with said control circuit; and
   a second switch element having a second end connected with said primary winding coil of said isolation transformer and a first end of said first switch element, and a control terminal connected with said control circuit, wherein said second switch element is selectively conducted or shut off according to a second pulse width modulation signal generated by said control circuit,
   wherein under control of said control circuit, said first switch element and said second switch element are selectively conducted or shut off according to said first pulse width modulation signal and said second pulse width modulation signal, so that electrical energy of said input voltage is selectively transmitted to said primary winding coil of said isolation transformer through said first switch element or said second switch element.

18. The current-sharing supply circuit according to claim 16 wherein said control circuit is a digital signal processor, a micro processor, a pulse width modulation controller, or a pulse frequency modulation controller.

19. The current-sharing supply circuit according to claim 13 wherein a second layer of each current-sharing transformer set comprises multiple current-sharing branches, each of said current-sharing branches comprises multiple current-sharing transformers, primary winding coils of said current-sharing transformers of each current-sharing branch are serially connected with secondary winding coils of corresponding current-sharing transformers of the former layer.

20. A current-sharing supply circuit for driving multiple sets of DC loads, said current-sharing supply circuit comprising:
   a current providing circuit for receiving an input voltage and generating a driving current or a driving voltage;
   multiple output rectifier circuits connected with respective set of DC loads for rectification, thereby generating respective output currents to respective set of DC loads;
   multiple current-sharing transformer sets, wherein each current-sharing transformer set comprises multiple current-sharing transformers, and secondary winding coils of said current-sharing transformers are connected with respective output rectifier circuits; and
   multiple current-sharing circuits, wherein each current-sharing circuit and primary winding coils of said current-sharing transformers of a corresponding current-sharing transformer set are serially connected with an output terminal of said current providing circuit,
   wherein said output currents are substantially identical by adjusting the equivalent impedance values of said current-sharing circuits and said primary winding coils of serially-connected current-sharing transformers of corresponding current-sharing transformer sets.

* * * * *